United States Patent [19]
Simpson

[11] Patent Number: 5,951,957
[45] Date of Patent: Sep. 14, 1999

[54] METHOD FOR THE CONTINUOUS DESTRUCTION OF OZONE

[75] Inventor: Dale R. Simpson, Bethlehem, Pa.

[73] Assignee: Competitive Technologies of PA, Inc., Bethlehem, Pa.

[21] Appl. No.: 08/988,329

[22] Filed: Dec. 10, 1997

Related U.S. Application Data

[60] Provisional application No. 60/032,687, Dec. 10, 1996.

[51] Int. Cl.$^6$ ............................ C01B 13/00; B01D 53/66
[52] U.S. Cl. ................................................ 423/219
[58] Field of Search .................... 423/219, 210; 95/138, 902

[56] References Cited

U.S. PATENT DOCUMENTS

| | | | |
|---|---|---|---|
| 1,345,323 | 6/1920 | Frazer et al. | |
| 3,006,153 | 10/1961 | Cook | 62/48 |
| 4,101,296 | 7/1978 | Lowther | 55/33 |
| 4,184,983 | 1/1980 | Putz et al. | 252/466 |
| 4,200,609 | 4/1980 | Byrd | 422/122 |
| 4,207,291 | 6/1980 | Byrd et al. | 422/122 |
| 4,259,299 | 3/1981 | Hagiwara et al. | 423/210 |
| 4,619,821 | 10/1986 | Ely | 423/579 |
| 5,080,882 | 1/1992 | Yoshimoto et al. | 423/579 |
| 5,160,586 | 11/1992 | Yoshimoto et al. | 204/59 R |
| 5,212,140 | 5/1993 | Yoshimoto et al. | 502/300 |
| 5,472,676 | 12/1995 | Terui et al. | 423/219 |
| 5,698,165 | 12/1997 | Terada et al. | 422/122 |
| 5,810,910 | 9/1998 | Ludwig et al. | 95/138 |
| 5,846,298 | 12/1998 | Weist, Jr. | 95/138 |

FOREIGN PATENT DOCUMENTS

| | | | |
|---|---|---|---|
| 0038224A2 | 4/1981 | European Pat. Off. | B01D 53/36 |
| 0277843A2 | 2/1988 | European Pat. Off. | B01D 53/63 |
| 0387044A1 | 3/1990 | European Pat. Off. | B01D 53/63 |
| 0467526A2 | 6/1991 | European Pat. Off. | B01D 53/36 |

OTHER PUBLICATIONS

Imamura, S., Ikebata, M., Ito, T., Ogita, T., *Decomposition of Ozone On a Silver Catalyst*, Ind. Eng. Chem. Res., No. 30:217–221, (1991).

Arai, K., *Development Of Filter For Decomposing Ozone*, Kobelco Technology Review, No. 12: 52–55 (1991).

Masschelein, W.J., *Contacting of Ozone With Water and Contactor Offgas Treatment*, Ch. 6, Handbook Of Ozone Technology And Applications, vol. 1, eds. R.G. Rice and A. Netzer, Ann Arbor Science Pub., 1992.

*Primary Examiner*—Gary P. Straub
*Assistant Examiner*—Timothy C Vanoy
*Attorney, Agent, or Firm*—Michael R. Novack; John W. Fitzpatrick

[57] ABSTRACT

A process is provided for continuously decomposing ozone in the presence of water or water vapor by contacting the ozone containing gas with a zeolite, such as mordenite, dealuminized mordenite, zeolite Y or zeolite 13 X, at a temperature at which water or water vapor is not sorbed by the zeolite, such as 128 to 175° C.

8 Claims, No Drawings

METHOD FOR THE CONTINUOUS DESTRUCTION OF OZONE

RELATED APPLICATIONS

This application claims priority from U.S. Provisional Patent Application No. 60/032,687, filed Dec. 10, 1996, and said Provisional Patent Application is incorporated herein by reference.

FIELD OF THE INVENTION

This invention relates to a method for the removal of ozone from air, and more particularly to a technique for continual removal and destruction of ozone in the presence of water vapor.

BACKGROUND OF THE INVENTION

Ozone is a powerful oxidant which may be used as a disinfectant, bleach, or a reactant for an oxidation process. Ozone is easily detected by its pungent odor around electrical devices, especially photocopy machines. Industrial uses of ozone include; treatment of public water supplies (in 1990 there were 2000 plants worldwide, 20 in the U.S. and 50 in Canada built between 1970 and 1990 using ozone); treatment of industrial and municipal waste; silicon chip production; pharmaceuticals; and bleaching of fibers, fabric, paper pulp, and liquids. Being an oxidant, ozone may also be used as a bleach for cotton, paper, pulp, or liquids, or it may be used to treat waste streams which contain organic matter or require disinfection.

For many of these large quantity uses, excess ozone is present with water vapor. With such uses, ozone may replace chlorine as a bleach and mitigate the problems of chlor-carbon or organochlorine compounds remaining in the water, aerated, or formed during combustion of chlor-carbon waste.

For example, traditional chlorine bleaching creates wastewater containing hazardous organic compounds. In the wastewater stream, chlorine binds to organic matter to produce chemicals called organochlorines almost all of which are foreign in nature. These organochlorine compounds, which are extremely harmful, are very stable in the environment. Organochlorines bioaccumulate so they are stored in the body fat of humans and animals. Some of the known effects of organochlorines include hormonal disruption, infertility and lowered sperm counts, behavioral changes and damage to the skin, liver and kidneys. One of the best studied organochlorines, tetrachlorodiebenzo-p-dioxin or Dioxin, is a known carcinogen and thought to be an endocrine disrupter.

Use of chlorine bleaching in paper production results in hundreds of thousands of pounds of organochlorines being dumped into U.S. rivers annually. Studies have measured one hundred seventy seven different organochlorines in human populations throughout the U.S. and Canada.

Unlike the traditional chlorine bleaching methods used in pulp bleaching and other industrial uses, ozone bleaching offers the ability to close a mills water system and produce totally chlorine-free pulp.

Although ozone is important in a wide range of industrial and municipal processes, it is a toxic chemical. Ozone has a threshold limiting value of 0.1 ppm, so that the production or use of this chemical requires destruction of any excess or residual ozone. Ozone bearing tail gases from industrial processes and indoor and aircraft contamination with ozone require treatment.

Unlike organochlorines, destruction of ozone is accomplished by heating vapors containing ozone to about 316° C. for several seconds. Utilizing this method, approximately 65% of the energy for heating can be recovered by heat exchangers. However, such a system has a high operating cost due to the relatively high temperatures required by such a system.

Unlike industrial and municipal uses, low levels of ozone, as in aircraft cabins, may be removed by passing the ozone through an activated carbon filter or a filter with a catalyst. These filters must be periodically replaced because the carbon is consumed and the catalyst becomes poisoned. A useful catalyst for ozone treatment by filtration is "hopcalcite", which is about 80% $MnO_2$, 0.2% Cu, and the residual is $Li_2O$ and $K_2O$. Other catalysts for ozone, as given in the literature, are different transition metals, silver, and the noble metals.

Studies show that some ozone can be stored at low temperatures in a zeolite, and later destroyed at higher temperatures. Metal catalysts used with zeolites have been used to promote the decomposition of ozone. However, the metal catalysts are most often transition metals, noble gases or heavy metals which raises concerns in regard to health and costs.

Ozone may also be destroyed at somewhat lower temperatures by passing the vapors over hopcalcite, certain other metals, activated carbon, or silicate compounds such as zeolites, sand or other mineral matter. These compounds act as catalysts for the decomposition of ozone, but unfortunately the catalysts are deactivated by the adsorption of water vapor on the catalyst surface.

Studies which consider the effect of water vapor in a gas stream indicate that the efficiency of zeolite based systems is decreased as water is adsorbed. Zeolites, which are molecular sieves, are excellent desiccants but must be dehydrated to reactivate the bed. Dehydration requires that the reactor containing the zeolite be heated to volatilize the water, and then cooled to return to service. Thus the treatment is a batch process and continuous treatment requires several reactors. These reactor beds commonly contain a costly transition metal with some losses due to attrition and venting to the outside air.

In the situation of industrial and municipal uses, excess ozone is usually present with water vapor, making decomposition of ozone by these above referenced methods difficult. The ubiquitous water vapor results in deactivation of the catalyst. The catalyst may be regenerated by: 1) heating, or 2) using an electrical field as disclosed in U.S. Pat. No. 4,101,296. If regeneration is by heating to desorb the water, the destruction of ozone is a batch process with a cycle of destruction of ozone until the adsorption of water deactivates the catalyst bed, then desorption of the water by heating, followed by cooling of the bed for regeneration and reuse.

It is known that zeolites are extremely effective at decomposing ozone without a metal catalyst in the absence of water or water vapor. However, as previously stated, it is also known that the adsorption of water vapor renders the zeolites inactive for the destruction of ozone, and reactivation requires the zeolite to be dried. An approach to this problem has been to use a hydrophobic zeolite, as described in European Application No. 88301002.7. However, hydrophobic zeolites are considerably more expensive than hydrophilic zeolites, and are less efficient than hydrophilic zeolites in ozone destruction. Therefore, there is a need to improve techniques for using zeolites in destroying ozone, especially in situations where the ozone is present in water or water vapor.

SUMMARY OF THE INVENTION

This invention provides a simple and inexpensive method for the continuous destruction of ozone in a gas stream containing water vapor. The invention allows the use of a hydrophilic sorbent to remove ozone present in a water vapor stream. Prior to this invention, the benefits of using a hydrophilic sorbent in situations where water vapor was present could not be fully realized.

The invention describes the passage of a gas stream containing ozone and water vapor over or through such a sorbent (e.g. bed of zeolites, carbon, metals, metal compounds, and sand), at elevated temperatures to permit the continuous destruction of ozone. The elevated temperatures maintain the sorbent at temperatures at which there is insufficient water adsorbed by the sorbent for deactivation of the sorbent. The required temperature is dependent on the nature of the sorbent and the water vapor pressure in the gas stream. Such a continuous process is simpler and cheaper than a batch process, which requires two reaction beds so that one could be reacting ozone as the other was heated to desorb water.

Therefore, it is an object of this invention to provide a method of continuous ozone destruction. It is a further object of this invention to provide a method for the destruction of ozone at a temperature of about one half that required for thermal destruction of ozone. It is a further object of this invention to provide a method of ozone destruction for commercial, industrial and municipal uses which will provide high energy savings and significant cost reduction.

DETAILED DESCRIPTION OF THE INVENTION

The invention includes the steps of providing ozone in the presence of water or water vapor; providing a sorbent (such as a zeolite); and exposing the sorbent to the ozone at a temperature above which the water or water vapor is not adsorbed by the sorbent. This has the resultant effect of reducing the number of sites on the sorbent which would otherwise be occupied by water.

As mentioned above, zeolites are extremely effective at decomposing ozone without a metal catalyst. Zeolites are silicates which contain aluminum ions as substitutes for silicon. Such a substitution results in a charge imbalance which is compensated by the addition of an alkali ion. It is the alkali which makes the zeolite hospitable for ion exchange. The framework of the molecular structures of different zeolites are arranged so that the zeolites contain cavities or voids having defined sizes. These cavities or voids have ports on the surface of the zeolite mineral which permit selective entry or exit by various minerals based upon their relative sizes. Zeolites have a wide range in physical and chemical properties, but for the zeolite to be repeatedly used as a chemical sorbent it must be: 1) resistant to a variety of chemicals, 2) stable under the conditions for the regeneration, and 3) have a surface nature and pore which attracts and accommodates the particular compound. It is generally recognized that ozone is adsorbed by the crystalline alkali metal aluminosilicates of zeolites.

Appropriate zeolites for the destruction of ozone consist of, but are not limited to, acid washed sodium mordenite, dealuminated mordenite, acid mordenite, zeolite Y and zeolite 13X (type Y). These zeolites may be prepared by methods as described in the following examples.

To prevent the adsorption of water by the sorbent the temperature of the sorbent bed must be increased to prevent or reduce adsorption of the water present in the vapor stream. It is anticipated that the temperature is maintained within this required temperature range during the exposure period of the sorbent to the vapor stream containing ozone. The required temperature is dependent on the nature of the sorbent and the water vapor pressure in the gas stream. In the case of zeolites, bed temperatures of 128 to 175° C. is sufficient for continuous destruction of ozone.

The reactive step in the process occurs upon bringing a gas stream containing ozone and water vapor, into contact with the sorbent bed. The gas stream may be allowed to pass over or through the sorbent, such as a bed of zeolites, thereby allowing the destruction of ozone. Ozone removal is caused by the reaction which occurs on the surface of the zeolite.

In a preferred embodiment, the zeolite is hydrophilic, lowering the temperature necessary for destruction, and the cost of operation.

Accordingly, the present invention is well adapted and suited to attain the objectives and ends and has the advantages and features mentioned as well as others inherent therein.

EXAMPLES

An air stream from an ozone generator passed through water in a gas washing bottle at 20° C. This air stream of 0.03 cu. ft./min., a relative humidity of 100% at 20° C., and containing 100 ppm. of ozone was passed through a heated bed of zeolites, and the exhaust from the bed was monitored for break through of ozone by the coloration of a potassium iodide solution. The zeolites were contained on fritted glass in a Pyrex tube and the bed temperature was continuously monitored with a thermocouple. This apparatus was used for all experiments.

Example 1

5.6 grams of acid washed sodium mordenite of −18+45 mesh gave a reactor bed of 2.5 cm. depth. The air stream, water vapor saturated at 20° C. and containing 100 ppm ozone, passed through the reactor bed at 152° C. with no ozone detected in the exhaust. With a bed temperature of 146° C., ozone was detected in the exhaust.

Example 2

6.0 grams of −18+70 mesh dealuminated mordenite, prepared by strong acid leaching and thermal soaks, replaced the sodium mordenite of example 1. Ozone was detected in the exhaust with a bed temperature of 150° C., but no ozone was detected after the bed temperature was raised and held at 152° C. for two hours. Thus the decomposition of ozone occurred in the water vapor bearing system on dealuminated mordenite between 150 and 152° C.

Example 3

8 grams of 1 mm. diameter particles of sodium mordenite in the described reactor system exhausted air in which ozone was undetected with the reactor temperature of 138° C., but ozone was detected in the exhaust flow after the reactor was cooled to 128° C.

Example 4

The reactant of the previous examples was replaced with 8 grams of 1 mm. diameter particles of acid mordenite. No ozone was detected in the exhaust with the reactor at a temperature of 144° C.

Example 5

6 grams of zeolite Y extrudates of 1/16" diameter and 2 to 5 mm. in length were used to replace the reactant bed of the previous example. Using the same gas flow and water vapor pressure, ozone was detected in the exhaust with the reactor at 161° C. After the reactor temperature was raised to 172° C., ozone was not detected in the exhaust.

Example 6

The bed of example 5 was replaced with zeolite 13X (type Y) of 8 to 12 mesh beads. Using the ozone bearing air and flow conditions previously cited, ozone was detected in the exhaust with a bed temperature of 122° C. and was not detected in the exhaust after the bed temperature was raised to 134° C.

While this invention has been described with reference to specific embodiments, it is not limited thereto. The appended claims are intended to be construed to include all forms and variants of the invention as may be devised by those skilled in the art without departing from the true spirit and scope thereof.

I claim:

1. A method for the continuous decomposition of ozone, comprising the steps of:

(a) providing ozone in the presence of water or water vapor;

(b) providing a zeolite; and (c) continuously exposing the zeolite to the ozone at a temperature above which the water or water vapor is not adsorbed by the zeolite.

2. The method as defined by claim 1 wherein the zeolite is hydrophilic.

3. The method as defined by claim 2 wherein hydrophilic zeolite is exposed to the ozone at a temperature of between about 128° C. to 175° C.

4. The method as defined by claim 1 wherein the zeolite is mordenite.

5. The method as defined by claim 1 wherein the zeolite is dealuminated mordenite.

6. The method as defined by claim 1 wherein the zeolite is sodium mordenite.

7. The method as defined by claim 1 wherein the zeolite is zeolite Y.

8. The method as defined by claim 1 wherein the zeolite is zeolite 13X.

\* \* \* \* \*